United States Patent

Datta

[15] 3,635,833
[45] Jan. 18, 1972

[54] MANGANESE ACTIVATED MAGNESIUM-LITHIUM ALUMINO-GALLATE LUMINESCENT MATERIAL

[72] Inventor: Ranajit Kumar Datta, East Cleveland, Ohio

[73] Assignee: General Electric Company

[22] Filed: Apr. 28, 1969

[21] Appl. No.: 819,919

[52] U.S. Cl. .................................................. 252/301.4 R
[51] Int. Cl. ........................................ C09k 1/04, C09k 1/68
[58] Field of Search ................................................ 252/301.4

[56] References Cited

UNITED STATES PATENTS 3,407,325  10/1968  Brown, Jr. .......................... 252/301.4
3,499,843  3/1970  Brown, Jr. et al ................... 252/301.4

OTHER PUBLICATIONS

Hoffman et al. Compound Formation and $Mn^{2\pm}$ Activated Luminescence in the Binary Systems $R_2O-$ and $RO-Ga_2O_3$ Journal Inorg. Nucl. Chem. 1968, Vol. 30, pp. 63– 79, pages 63– 77.

*Primary Examiner*—Robert D. Edmonds
*Attorney*—Henry P. Truesdell, Joseph B. Forman, Frank L. Neuhauser, Oscar B. Waddell and John F. McDevitt

[57] ABSTRACT

Manganese-activated lithium gallate, magnesium-lithium gallate, and magnesium-lithium alumino-gallate phosphors emit in the green region when excited by cathode rays and short-wavelength ultraviolet radiation.

3 Claims, 4 Drawing Figures

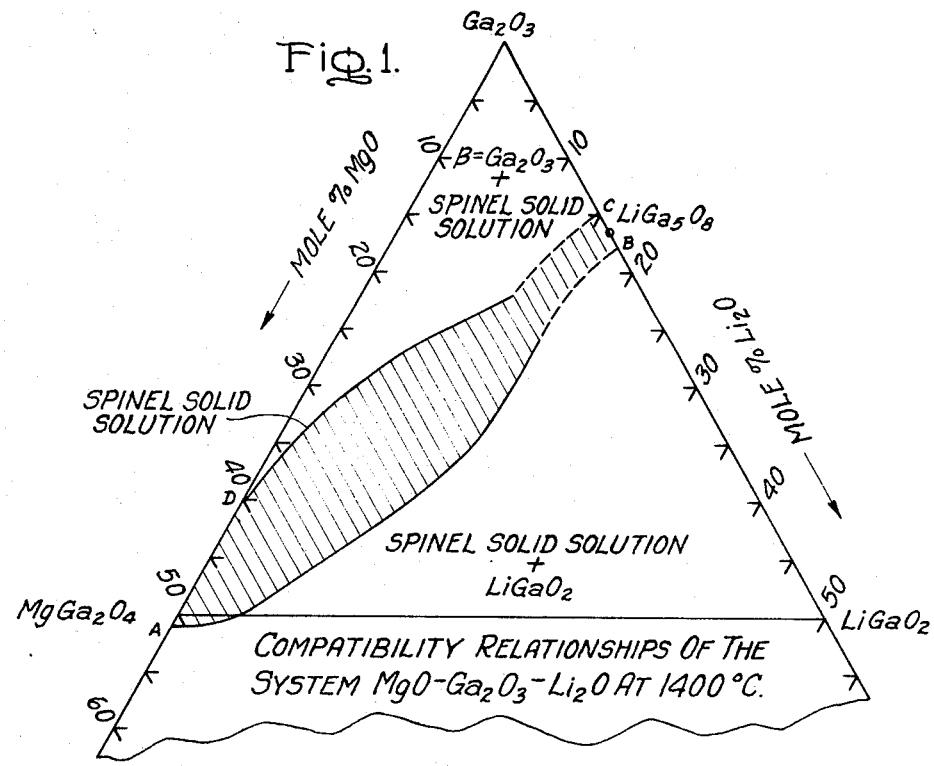
Fig. 1. COMPATIBILITY RELATIONSHIPS OF THE SYSTEM $MgO-Ga_2O_3-Li_2O$ AT $1400°C$.
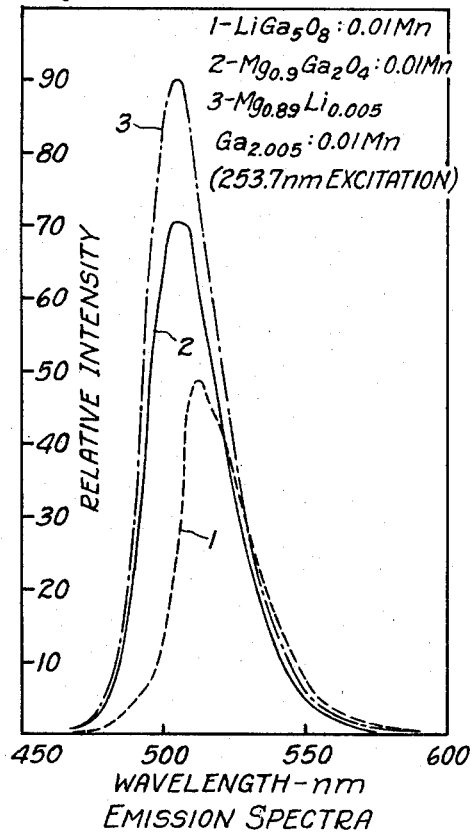
Fig. 2.
1 – $LiGa_5O_8 : 0.01Mn$
2 – $Mg_{0.9}Ga_2O_4 : 0.01Mn$
3 – $Mg_{0.89}Li_{0.005}Ga_{2.005} : 0.01Mn$
(253.7 nm EXCITATION)
EMISSION SPECTRA
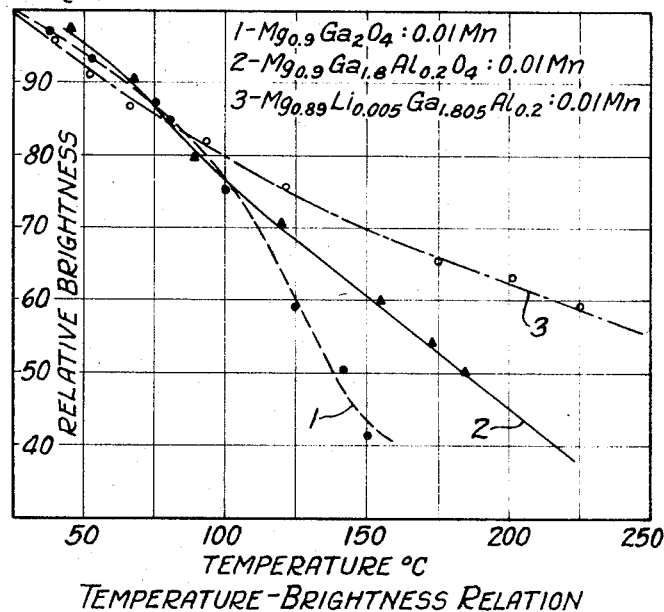
Fig. 4.
1 – $Mg_{0.9}Ga_2O_4 : 0.01Mn$
2 – $Mg_{0.9}Ga_{1.8}Al_{0.2}O_4 : 0.01Mn$
3 – $Mg_{0.89}Li_{0.005}Ga_{1.805}Al_{0.2} : 0.01Mn$
TEMPERATURE-BRIGHTNESS RELATION
Inventor:
Ranajit K. Datta
by Richard H. Burgess
His Attorney Inventor:
Ranajit K. Datta
by Richard H. Burgess
His Attorney

MANGANESE ACTIVATED MAGNESIUM-LITHIUM ALUMINO-GALLATE LUMINESCENT MATERIAL

BACKGROUND OF THE INVENTION

This invention relates to luminescent materials. More particularly, the invention relates to a group of manganese-activated lithium gallate phosphors.

Magnesium gallate-type phosphors have recently been disclosed for their possible application in fluorescent lamps used in xerographic copying machines. Brown, in U.S. Pat. No. 3,407,325, and in an article appearing in the *Journal of the Electrochemical Society*, March, 1967, pp. 33–37, observed an efficient luminescence in manganese activated magnesium gallate. Wanmaker et al., in an article appearing in Philips Res. Repts., 22, pp. 304–308, 1967, modified the formulation suggested by Brown by substituting a small amount of aluminum for gallium and observed a shift in the excitation band to a shorter wavelength. The luminescence quenching temperature of the luminescence of the aluminum-incorporated phosphor was found to be higher than that of the manganese-activated magnesium gallate. The composition of the matrix suggested by Brown was contained in the system $MgO—Ga_2O_3$, whereas the composition of the phosphor proposed by Wanmaker et al. was part of the ternary system $MgO—Ga_2O_3—Bl_2O_3$.

In the present invention, the composition of the phosphor has been modified by incorporating lithia ($Li_2O$) with proper charge compensation in the matrix. Such modification improves the luminescent properties of the phosphor such as room temperature brightness and high-temperature brightness. Thus, the incorporation of lithia in the phosphor of the present invention significantly increases the brightness of the phosphor and, further, the quenching temperature of the luminescence is raised. Further, the excitation bands become broader and the firing of the material can be done at a lower temperature than that suggested by the prior art without losing any brightness of the phosphor.

SUMMARY OF THE INVENTION

It is an object of the present invention to provide a luminescent material containing lithium having improved brightness at room temperature and at elevated temperatures.

Another specific object is to provide a fluorescent material wherein the quenching temperature of the luminescence is raised.

Another object is to broaden the excitation bands in relation to the aluminum substituted magnesium gallate, and a further object is to provide a phosphor that can be synthesized at a lower temperature without loss of brightness.

Briefly stated, the invention relates to a luminescent material consisting essentially of a crystalline compound of lithium gallate, optionally containing magnesium, and optionally containing aluminum, and having manganese incorporated integrally into the matrix as an activator, said compound having a crystal structure selected from the group consisting of a spinel-type structure and a simple cubic structure, and said compound containing between 0.001 and 0.5 moles of lithium per mole of the compound. More specifically, compounds of the invention have the following formula:

$$Mg_{x-2y}Li_yGa_{2+y-z}Al_zO_4:x'Mn$$

where $x$ has a value of from 1 to 0.7, $y$ has a value of from 0.001 to 0.5, $z$ has a value of from 0 to 1.0, and $x'$ has a value of from 0.001 to 0.07. As is commonly done in phosphor terminology, the activator is identified herein after a colon, as in ...:0.1Mn, and this indicates that the activator is incorporated in the lattice of the phosphor matrix.

In the above formula, preferably $x$ is from 0.8 to 1.0, $y$ is from 0.001 to 0.06, and $z$ is from 0 to 0.6. The preferred range of aluminum content is achieved when $z$ is from 0.05 to 0.4. Manganese is generally divalent in these phosphors and preferably has a concentration of $x'$ from 0.005 to 0.04. When $x$ is 1.0 and $y$ is 0.5, there is no magnesium in the composition, and the phosphor is lithium gallate activated by manganese and optionally containing aluminum.

Those parts of the present invention which are considered to be new are set forth in detail in the claims appended hereto. The invention, however, may be better understood and further objects and advantage thereof appreciated from a consideration of the drawings and detailed description.

DRAWINGS AND DETAILED DESCRIPTION

FIG. 1 is a diagram showing the subsolidus phase-equilibrium relationships in the ternary system $MgO-Ga_2O_3-Li_2O$ at 1,400° C.

FIG. 2 is a graph showing emission spectra of phosphors with and without $Li_2O$.

FIG. 4 is a graph of the relative brightness of phosphor compositions at varying temperatures.

Figure 3:
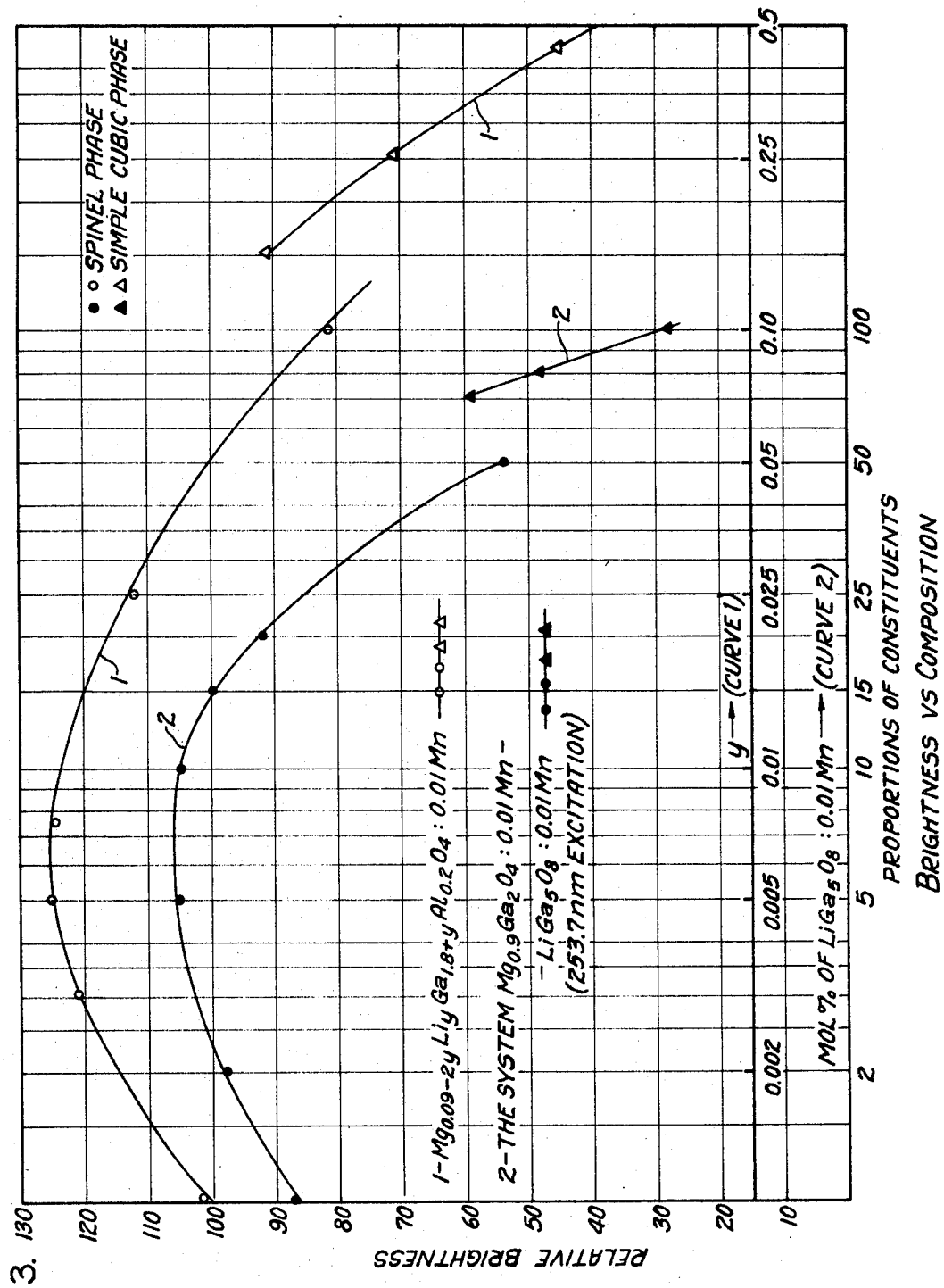
FIG. 3 is a graph depicting improved brightness due to the incorporation of $Li_2O$ in two different matrices, one with and the other without aluminum.

The phosphors of this invention exhibit a spinel structure or its crystalline solution. The prior art compositions were contained in the systems $MgO-Ga_2O_3$ of the above-cited Brown patent and $MgO-Ga_2O_3-Al_2O_3$ of the above-cited Wanmaker at al. article. The present system incorporates $Li_2O$ in the spinel lattice, and the composition of the matrix of the phosphor can be expressed in the terms of the quaternary system $MgO-Li_2O-Ga_2O_3-Al_2O_3$. However, since the proportion of $Al_2O_3$ is very small and for the sake of simplicity, the composition is diagrammatically shown in FIG. 1 as involving the ternary system $MgO-Ga_2O_3-Li_2O$. In addition to the quaternary, the invention also includes that ternary system itself without any $Al_2O_3$. It can be further simplified by saying that the matrix is essentially a crystalline solution between $MgGa_2O_4$ and $LiGa_5O_8$, with or without excess of $Ga_{2-z}Al_zO_3$ ($z=0$ to 1) over the stoichiometric proportion. Pure $LiGa_5O_8$ ($Li_{0.5}Ga_{2.5}O_4$ when $x=1$, $y=0.5$, $z=0$) has two polymorphs: the low-temperature simple cubic phase undergoes a very fast, reversible transition at 1,138 ±3° C. to the high-temperature spinel phase. Both of these polymorphs have significant luminescence and show extensive solid solution with $MgGa_2O_4$ and $Ga_{2-z}Al_zO_3$. The high-temperature phase cannot be quenched rapidly enough to be retained to room temperature even in ordinary laboratory size samples (about 5–10 g.) when $y$ in the above equation is about 0.3 or more, as indicated by the dotted line boundaries at the right of the spinel phase in FIG. 1. Both forms of $LiGa_5O_8$ and its crystalline solution with $MgGa_2O_4$ show luminescence.

FIG. 1 shows the spinel forming compositions of the system $MgO-Ga_2O_3-Li_2O$ at 1,400° C. Any composition in this ternary system indicated by any point in the shaded area will, on equilibration at 1,400° C., result in a single spinel-type phase having the same crystal structure as a true spinel composition. In other words, any composition lying within the area ABCD will form a spinel when equilibrated at 1,400° C. However, as the temperature of equilibration increases, the spinel-forming area ABCD expands. When the temperature of equilibration is lower, the area ABCD shrinks. According to the present invention, the phosphor can be synthesized within wide composition and temperature ranges. However, the composition and the firing temperature should be so selected that the final luminescent material is of spinel or simple-cubic structure.

Referring now to FIG. 2, there is shown the emission spectra of:

1. $LiGa_5O_8$:0.01Mn
2. $Mg_{0.9}Ga_2O_4$:0.01Mn
3. 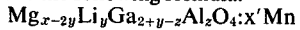:0.01Mn

Manganese-activated magnesium-lithium alumino-gallate (spinel) when excited by cathode rays or ultraviolet radiation shows narrow band emission spectrum extending from 465 to 585 nanometers (nm.) with a peak of 505 nm. As referred to above, $LiGa_5O_8$ itself, and compositions of the invention that are primarily $LiGa_5O_8$, have two polymorphs: the low-temperature simple cubic form, and the high-temperature spinel form. The low-temperature form or its crystalline solutions activated with $Mn^{2+}$ show narrow-band emission peaking at 512 nm. under cathode rays or short wavelength ultraviolet radiation.

The unactivated gallates of the system MgO-Ga$_2$O$_3$-Li$_2$O-Al$_2$O$_3$, such as Mg$_{0.89}$Li$_{0.005}$Ga$_{1.805}$Al$_{0.2}$O$_4$ and LiGa$_5$O$_8$, are white body colored, and show blue luminescence (emission maxima at about 405 nm.) under cathode rays and ultraviolet radiation. When a small amount of Mn$^{2+}$ is incorporated in the gallate lattice (spinel) the material acquires a white to pale green body color and responds very well to cathode rays and ultraviolet radiations —especially radiations with wavelengths ranging from 200–280 nm. The nature of the emission and the relative responses are functions of composition.

FIG. 3 shows improved brightness due to the incorporation of varying amounts of Li$_2$O in Mg$_{0.9}$Ga$_{1.8}$Al$_{0.2}$O$_4$:0.01Mn. The relative brightness is shown in table I below. FIG. 3 also shows the effect on brightness OF INCORPORATION of LiGa$_5$O$_8$ in the Mg$_{0.9}$Ga$_2$O$_4$:0.01Mn lattice, as given in table II below. To show the beneficial effects of incorporating Li$_2$O in the matrices, two previously disclosed phosphor compositions, namely Mg$_{0.9}$Ga$_{1.8}$Al$_{0.2}$O$_4$:0.01Mn and Mg$_{0.9}$Ga$_2$O$_4$:0.01Mn, are compared with phosphors of the invention.

FIG. 4 depicts relative brightness as temperature is increased of:

1. Mg$_{0.9}$Ga$_2$O$_4$:0.01Mn of the prior art,
2. Mg$_{0.9}$Ga$_{1.8}$Al$_{0.2}$O$_4$:0.01Mn of the prior art, and
3. Mg$_{0.89}$Li$_{0.005}$Ga$_{1.805}$Al$_{0.20}$O$_4$:0.01Mn of the invention.

It has been observed that manganese-activated magnesium gallate shows a sharp decrease in photoluminescent brightness with increase in temperature of the phosphor. When small amounts of Al$_2$O$_3$ are incorporated in the MgGa$_2$O$_4$:Mn lattice, it is observed that the quenching temperature of the luminescence is higher than that of magnesium gallate MgGa$_2$O$_4$:Mn. According to the present invention, incorporation of Li$_2$O (with proper charge compensation) in the matrix raises the quenching temperature to even a higher value. Thus, when excited under 2,537 A. radiation, Mg$_{0.9}$Ga$_2$O$_4$:0.01Mn shows 50 percent of its room temperature brightness when the sample is heated to about 140° C., whereas Mg$_{0.9}$Ga$_{1.8}$l$_{0.2}$O$_4$:0.01Mn shows 50 percent of its room temperature brightness at 185° C. A preferred embodiment of this invention (Mg$_{0.89}$Li$_{0.005}$Ga$_{1.805}$Al$_{0.20}$O$_4$:0.01Mn) loses 50 percent of its room temperatures brightness only at temperatures well above 250° C., as shown in FIG. 4.

The following tables I and II show the improved relative brightness of phosphors of the invention, along with peak emission wavelengths, due to the incorporation of varying amounts of Li$_2$O, represented in table I by $y$, in the matrix.

TABLE I.—EMISSION WITH VARYING Li CONTENT

| Composition | $y$ | Relative brightness 253.7 nm. excitation | Peak emission (nm.) |
|---|---|---|---|
| Mg$_{0-2y}$Li$_y$Ga$_{1.8+y}$Al$_{0.2}$O$_4$:0.01 Mn | 0 | 100 | 505 |
| Same as above | 0.001 | 102 | 505 |
| Do | 0.002 | 110 | 505 |
| Do | 0.003 | 120 | 505 |
| Do | 0.005 | 125 | 505 |
| Do | 0.0075 | 123.5 | 505 |
| Do | 0.025 | 112 | 505 |
| Do | 0.05 | 96.5 | 505 |
| Do | 0.10 | 81.6 | 505 |
| Do | 0.15 | 90 | 507[1] |
| Do | 0.25 | 71.5 | 508[1] |
| Do | 0.45 | 45 | 512[1] |

[1] Simple cubic structure.

TABLE II.—EMISSION WITH VARYING SPINEL PHASE

| Composition of the spinel phase | Mole percent LiGa$_5$O$_8$:Mn | Relative brightness 253.7 nm. excitation | Peak Emission (nm.) |
|---|---|---|---|
| MgGa$_2$O$_4$:0.1 Mn | 0 | 85 | 505 |
| MgGa$_2$O$_4$:0.01 Mn and LiGa$_5$O$_8$:0.01 Mn | 1 | 87 | 505 |
| Same as above | 2 | 98 | 505 |
| Do | 5 | 105 | 505 |
| Do | 10 | 105 | 505 |
| Do | 15 | 100 | 505 |
| Do | 20 | 92 | 505 |
| Do | 50 | 54 | 505 |
| Do | 70 | 58 | 506[1] |
| Do | 80 | 48 | 508[1] |
| LiGa$_5$O$_8$:0.01Mn | 100 | 28 | 512[1] |

[1] Simple cubic phase.

The fluorescent materials can generally be prepared by a three step method. Since the final crystallographic structure of the matrix is a function of temperature and composition, the highest temperature of firings can be selected in the range of 900°–1400° C. or higher to obtain the spinel or simple-cubic structure.

The preparation of the spinel form of the phosphor involves a three-step solid-state firing process. MgCO$_3$, Li$_2$CO$_3$, Ga$_2$O$_3$, Al$_2$O$_3$, and MnCO$_3$ were weighed and mixed in appropriate proportions. The mixed sample was heated at a lower temperature such as 1,000° C. for about 2 hours to minimize lithium volatilization, followed by a second heat treatment at 1,400° C. for 8 hours to form the compound. The first two heat treatments were carried out in air, and the samples were contained in platinum containers. The third and the final heat treatment was carried out in a very mild reducing atmosphere at 1,200° C. for about 2 hours and the samples were contained in silica boats. During this reduction, Mn was reduced to Mn$^{2+}$ with little reduction of Ga$^{3+}$ Specific examples of the procedures used in the preparation of the phosphor composition of this invention are given as follows:

EXAMPLE I 0.923 g. of Li$_2$CO$_3$
11.715 g. of Ga$_2$O$_3$
0.061 g. of MnCO$_3$ (58.01% MnO by weight)

These ingredients were mixed and fired at 1,000° C. for 2 hours, followed by regrinding and a second firing at 1,400° C. for 8 hours. The sample was cooled, reground and finally reduced at 1,200° C. for 1 ½ hours under very mild reducing conditions (a mixture of hydrogen and nitrogen gas passed through the furnace). Under such conditions any quantity of a higher valent form of Mn is reduced to Mn$^{2+}$. The finished phosphor, LiGa$_5$O$_8$:0.01Mn responds very well to cathode rays and short-wavelength ultraviolet radiations and emits a narrow-band spectrum with a peak at 512 nm.

EXAMPLE II

To show that lithia (Li$_2$O)-incorporated samples fired at lower temperature produce the same or higher brightness as samples without Li$_2$O fired at 1,400° C., the following samples with two different compositions were prepared. SAMPLE 1

4.302 g. of MgCO$_3$ (42.5% MgO by weight)
9.372 g. of Ga$_2$O$_3$
0.061 g. of MnCO$_3$ (58.01% MnO by weight)

The above ingredients were mixed together and fired at 1,000° C. for 2 hours. The product was divided into two parts. Part A was fired at 1,400° C. for 8 hours in air, then in a reducing atmosphere at 1,200° C. for 1½ hours. Part B was fired at 1,300° C. for 8 hours in air, then in a reducing atmosphere at 1,200° C. for 1½ hours. Thus, two differently heat-treated (1,400° C., 1,300° C.) samples with the composition Mg$_{0.9}$Ga$_2$OBY4:0.01Mn were obtained.

SAMPLE 2

4.2542 g. of MgCO$_3$ (42.5% MgO by weight)
9.395 g. of Ga$_2$O$_3$
0.009 g. of Li$_2$CO$_3$
0.061 g. of MnCO$_3$ (58.01 % MnO by weight)

The ingredients mixed together underwent the same heat treatment as sample 1, and two samples of the composition Mg$_{0.89}$Li$_{0.0052.005}$O$_4$:0.01Mn fired at 1,300° C. and 1,400° C. were obtained. The following brightness data were derived, showing improvements over the materials of the above-cited Brown patent:

TABLE III

Brightness vs. Firing Temperature

| Composition | Highest Firing Temp. °C. | % Relative uv-brightness |
| --- | --- | --- |
| $Mg_{0.9}Ga_2O_4$:0.01Mn | 1,400 | 100 |
| $Mg_{0.9}Ga_2O_4$:0.01Mn | 1,300 | 89.7 |
| $Mg_{0.89}Li_{0.005}Ga_{2.005}O_4$:0.01Mn | 1,300 | 101.2 |
| $Mg_{0.89}Li_{0.005}Ga_{2.005}O_4$:0.01Mn | 1,400 | 118 |

EXAMPLE III 4.254 g. of $MgCO_3$ (42.5% MgO by weight)
8.458 g. of $Ga_2O_3$
0.78 g. of $Al_2O_3 \cdot 3H_2O$
0.009 g. of $Li_2CO_3$
0.061 g. of $MnCO_3$ (58.01% MnO by weight)

Thoroughly mixed ingredients underwent the heat treatment described in example I. The phosphor, $Mg_{0.89}Li_{0.005}Ga_{1.805}Al_{0.2}O_4$:0.01Mn, was obtained. It responded very well to cathode rays and ultraviolet radiations with a narrow-band emission peaking at 505 nm. The luminescent brightness under 2,537 A. radiation is 123 percent of $Mg_{0.9}Ga_{1.8}Al_{0.2}O_4$:0.01n.

As many widely different embodiments of this invention may be made without departing from the spirit and scope thereof, it is to be understood that this invention is not limited to the specific embodiments discussed except as defined in the appended claims.

What is claimed as new and desired to be secured by Letters Patent of the United States is:

1. A luminescent material consisting essentially of a crystalline compound of lithium gallate containing magnesium, optionally containing aluminum, and having manganese incorporated integrally into the matrix in accordance with the following formula:

$$Mg_{x-2y}Li_yGa_{2+y-z}Al_zO_4:x'Mn$$

wherein:
  $x$ is from 0.8 to 1.0,
  $x'$ is from 0.001 to 0.07,
  $y$ is from 0.001 to 0.06, and
  $z$ is from 0 to 0.6.

2. A luminescent material consisting essentially of a crystalline compound of lithium gallate containing magnesium, and having manganese incorporated integrally into the matrix having the following composition:

$$Mg_{0.89}Li_{0.005}Ga_{1.805}Al_{0.2}O_4:0.01Mn$$

wherein Mn is divalent.

3. A luminescent material consisting essentially of a crystalline compound of lithium gallate containing magnesium, and having manganese incorporated integrally into the matrix having the following composition:

$$Mg_{0.89}Li_{0.005}Ga_{2.005}O_4:0.01Mn$$

* * * * *